Patented Apr. 1, 1930

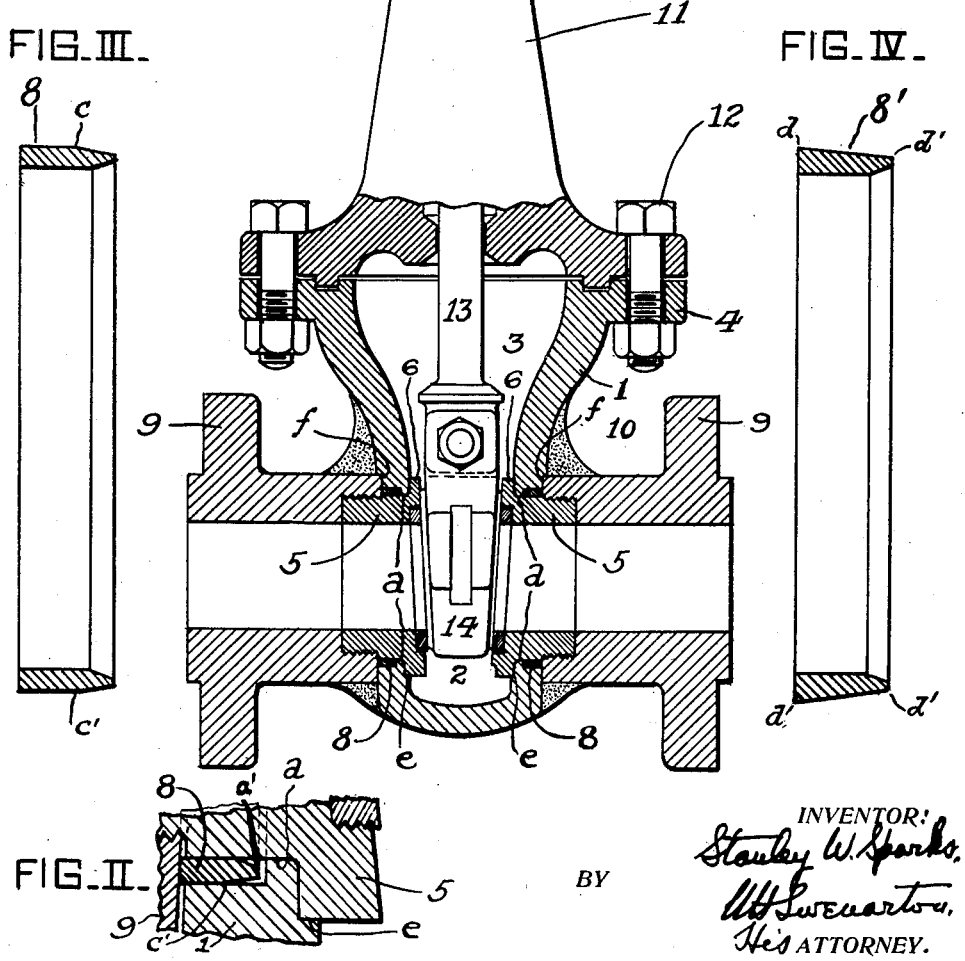

1,752,657

UNITED STATES PATENT OFFICE

STANLEY W. SPARKS, OF SUMMIT, NEW JERSEY, ASSIGNOR TO THE COLUMBUS MACHINE COMPANY, OF COLUMBUS, OHIO, A CORPORATION OF OHIO

GATE VALVE

Application filed November 20, 1925. Serial No. 70,208.

This invention relates to improvements in gate valves and has for its principal objects the production of a valve of this type which is extremely resistant to distortion or leakage due to high pressures and temperatures and is economical to manufacture, as well as attractive in appearance.

My invention is fully set forth in detail in the following description and drawings forming a part thereof in which Figure 1 is an elevation partially in section of my improved valve body;

Fig. 2 is an enlarged detail vertical section of the sealing ring and the contacting parts of a valve body;

Fig. 3 is an enlarged vertical section of one form of sealing ring, and

Fig. 4 is an enlarged vertical section of a modified form of sealing ring.

Referring to the drawings and the construction shown therein, the reference numeral 1 designates the casing of a valve body having preferably an oblong chamber 2 in the lower portion thereof and upper flaring heat radiation chamber 3 at the top thereof and also having a perpheral flange 4 on the upper end thereof.

Cylindrical internal bushing members 5 having peripheral flanges 6 on their respective inner ends are mounted in circular apertures $a$ formed in the flattened side walls of said casing, said apertures being provided with recesses $a'$. Sealing rings, comprising an oversized annulus 8, having slightly tapered inner ends commencing at the points $c$, $c'$ are inserted in the recesses $a'$ and when a bushing is mounted in the apertures $a$, the taper thereof will tend to force the rings into snug engagement with the rim of the apertures $a$ and the adjacent external face of the bushing 5. Preferably the tapered portion is about $3\frac{1}{3}°$ from a horizontal or straight line corresponding to the extension of the annulus 8.

In Fig. 4, I have illustrated a modified form of sealing ring in which the entire inner face of the oversize ring 8' conforms to a true cylinder, while the outer face is tapered between points $d$ and $d'$. Either type of sealing ring is effective for the purposes herein described.

Hollow hub members 9, as shown, are threaded onto a threaded portion of the outer ends of said internal bushings after the latter have been properly alined in apertures $a$ and then preferably fillet welds 10 are employed to more effectively seal the joint between the walls of the casing 1 and the said hub members.

As shown, the lower inner edge of each internal bushing is let into the wall of the chamber 2 which is cut away to receive the same as indicated by the reference letter $e$ and likewise the upper inner edge of each hub member is let into the outer wall of the casing 3 which is cut away or machined to receive the same as indicated by the reference letter $f$.

The bonnet member 11 is bolted by means of bolts 12 to the aforesaid flange 4, the said bonnet member affording a vertical guide for the valve stem 13 to the lower end of which is pivotally secured a gate member 14, which latter is adapted to co-operate with the valve faces of said internal bushing members and effectively seal the passage through the valve body against the passage of fluids when the gate is in its lowermost position. A hand wheel 15 which is secured to a threaded bushing member rotatably mounted within the sleeve 16, serves to raise and lower the valve stem and the gate carried thereby in the well known manner.

Among the advantages of the foregoing construction are the fact that the valve is, as previously stated, extremely resistant to distortion or leakage and can be assembled with ease to insure an unusually accurate fit between the gate and its co-operating valve seats. The heat-radiation chamber 3 in particular is resistant to distortion not only because of the arch-shaped configuration of the walls thereof, but particularly because the greatly increased area of the upper part of this chamber, as compared to its base, results in dissipation, through radiation and conduction, of the heat from the interior of the chamber, thus rendering the type of body highly suitable for high temperature and pressure requirements such as are met with in oil refineries.

Furthermore, the compression rings, which are formed of annealed steel of say .30 to .35 carbon content or like metal capable of a slight cold flow under high pressure, become almost an integral part of the valve body as they conform to the shape of the recesses into which they are driven and completely seal the same against the passage of fluid therethrough.

This application is a continuation in part of applicant's co-pending application for Valves, Serial No. 729,752, filed August 2nd, 1924.

Having thus described my invention, what I claim and desire to obtain by Letters Patent of the United States is:

1. In a valve, the combination comprising a valve body member having opposing lateral apertures adapted to receive internal bushing members, the outer walls of said valve body being provided with a marginal annular recess, adjacent said apertures, flanged internal bushings fitted into said apertures and projecting outwardly therefrom, hub members fitted to the outer ends of the respective bushings and tapered, metallic compression sealing rings tightly fitted into said recesses and substantially completely filling the same.

2. In a valve, the combination comprising a valve body member having opposing lateral apertures adapted to receive internal bushing members, the outer walls of said valve body being provided with a marginal annular recess, adjacent said apertures, flanged internal bushings fitted into said apertures and projecting outwardly therefrom, hub members fitted to the outer ends of the respective bushings and cylindrical metallic sealing rings having a tapered portion at their respective inner ends tightly fitted into said recesses and substantially completely filling the same.

3. In a valve, the combination comprising a valve body member conforming in configuration to a cylinder having partially flattened apertured side walls forming a lower valve chamber of oblong cross section and an upper flaring radiation chamber, internal bushings secured in said apertures of the side walls, hub members secured to said bushings and tapered metallic compression rings sealing the joint between said body member, said internal bushings and said hubs, said rings being of annealed steel of a character adapted to flow slightly under high compression, said valve structure being exceedingly resistant to distortion.

4. A valve assembly, including a valve body having a valve chamber in the lower portion thereof, said valve chamber having opposing lateral apertures, internal bushings tightly fitted into said apertures, hub members secured to said internal bushings at the outer ends of the latter and tapered metallic compression rings abutting the hub members, said rings being of annealed steel of a character adapted to flow slightly under high pressure and extending into close proximity to the wall of said valve body and contacting with the marginal walls of said apertures and said internal bushings respectively.

Signed at New York, in the county and State of New York, this 6th day of Nov., 1925.

STANLEY W. SPARKS.